July 9, 1935.  G. A. PAULIN  2,007,873
VEHICLE BODY TOP CAPABLE OF BEING STOWED AWAY
Filed Dec. 15, 1932    3 Sheets-Sheet 2
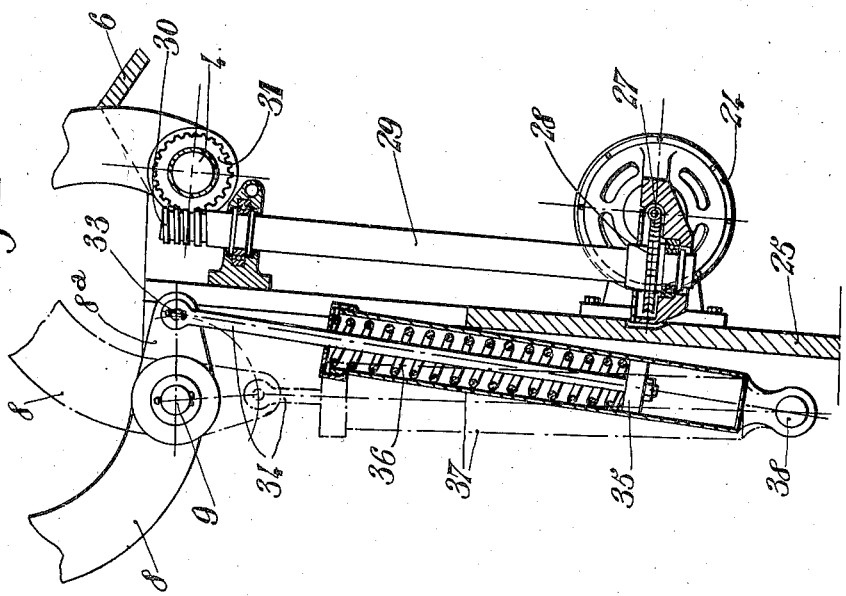
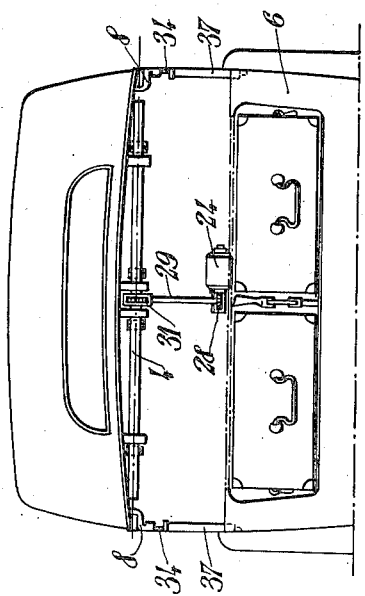
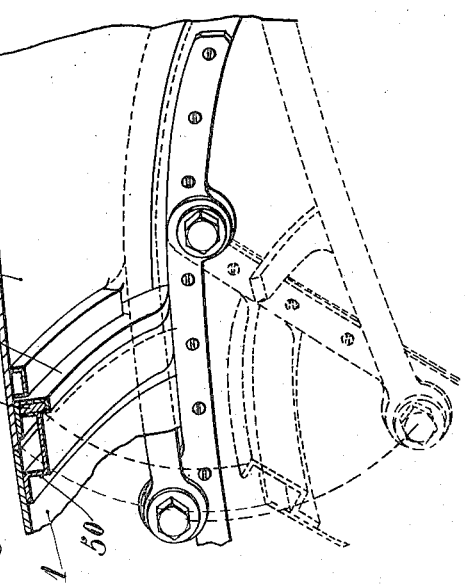
G. A. Paulin
INVENTOR
By: Marks & Clerk
Attys.

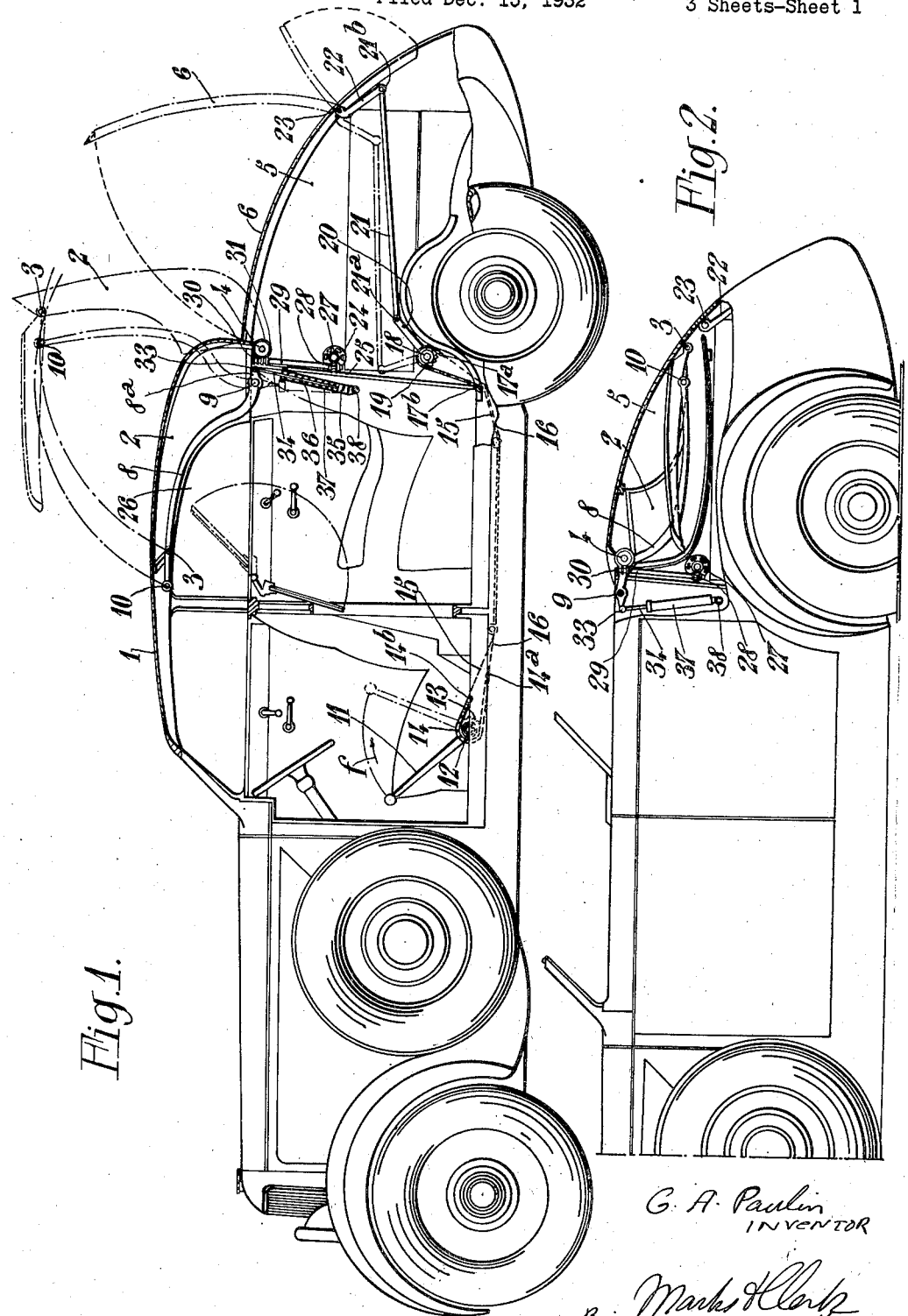

July 9, 1935.  G. A. PAULIN  2,007,873
VEHICLE BODY TOP CAPABLE OF BEING STOWED AWAY
Filed Dec. 15, 1932  3 Sheets-Sheet 3
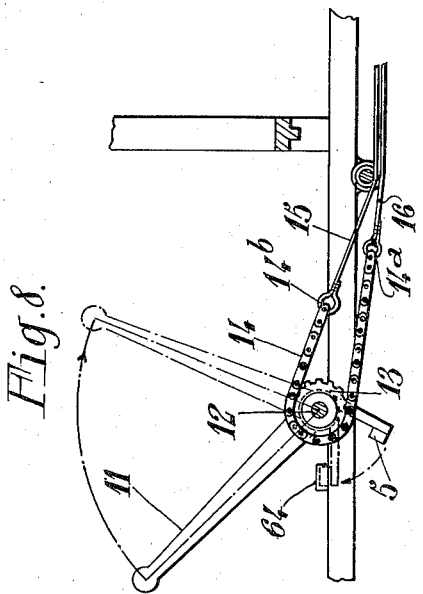
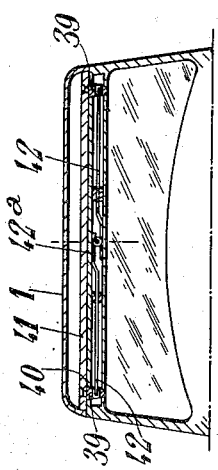
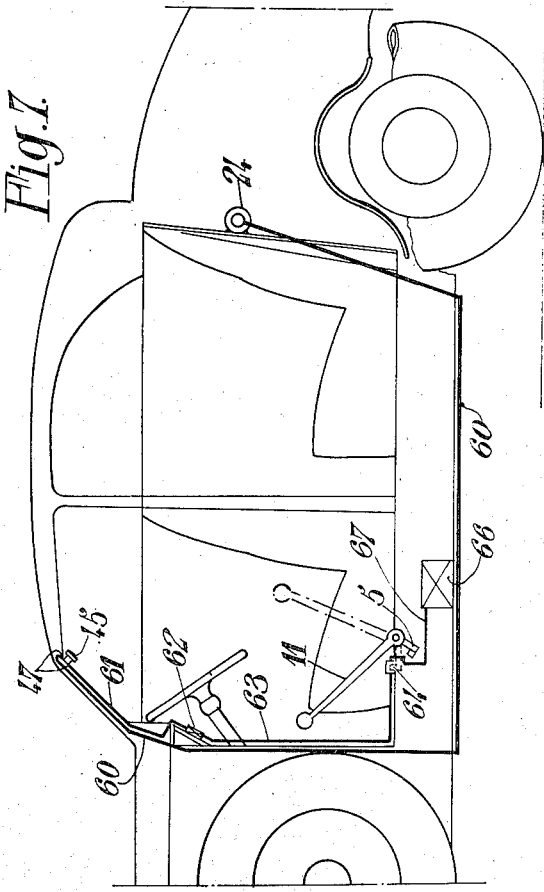
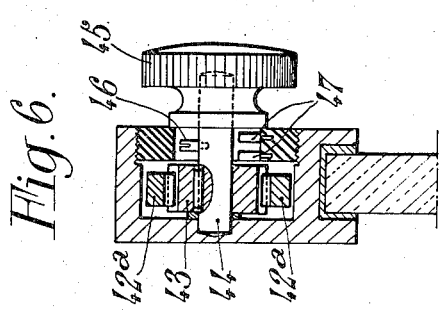
G. A. Paulin.
INVENTOR
By Marks & Clerk
ATTYS Patented July 9, 1935

2,007,873

UNITED STATES PATENT OFFICE 2,007,873

VEHICLE BODY TOP CAPABLE OF BEING STOWED AWAY

Georges Auguste Paulin, Malakoff, France

Application December 15, 1932, Serial No. 647,485
In France December 19, 1931

2 Claims. (Cl. 296—117)

In my French Patent No. 733,380, dated June 2, 1931, convertible car bodies have already been proposed, in which the body top is constituted by one or two elements kinematically connected together in such a manner that they can be withdrawn within a receptacle or spider arranged at the rear part of the vehicle and normally closed by means of a pivoted cover or panel. The various operations for placing the body top in normal position for use or for stowing it away are the following: the rear receptacle or spider is opened by causing its cover to pivot, the body top is moved into the spider or on the car body according as the body top is placed in position for use or stowed away, and, finally, the spider is closed.

In the French patent above mentioned, these various operations were effected from one and the same control member operated by the driver or by an occupant of the vehicle. I have found that, considering the diversity of operations to be effected as well as the great difference of the forces exerted according as the cover of the spider or the body top is being operated, the various actuating mechanisms were very complicated and unpractical. In fact, in order that the operation of the control member would not tire too much the driver or occupant of the vehicle, he had to control the various devices through the medium of stress reducing members and this took a very long time for placing the body top in position or stowing it away, whilst the actuation of the spider cover could have been very rapidly effected considering the small stress involved.

Moreover, in the car body as disclosed in the above mentioned patent, the body top, upon entering the spider or when issuing from the same, is in an overhanging position, without any device being provided for compensating this relatively considerable weight. The operating members supported from this fact the totality of the weight and I have found that they became rapidly out of use.

Furthermore, the operation was laborious and led to the use of transmission members of large dimensions. Thus, for instance, it was necessary to give to the cables used for the transmission cross, sections inconsistent with the small diameters of the guide grooved pulleys employed, which diameters could not be increased beyond a certain limit considering the small amount of room available.

The present invention, which remedies the above mentioned inconveniences, is particularly characterized by the fact that the actuation of the spider cover and that of the body top are effected from distinct members controlled by one of the occupants of the vehicle. Another feature of the invention consists in that the swinging movement of the body top about its pivot causes the operation of a resilient device acting in antagonism to the weight of the body top.

In order to prevent the body top being actuated before the spider has been opened, an important feature of the present invention consists in that the control lever of the spider cover controls the member actuating the body top.

I have also found that the body top being in position on the vehicle, it was indispensable that the occupant should be unable to act on the operating member of the body top without having previously unlocked the body top from the wind shield to which it is secured, and this constitutes another feature of the invention.

Besides, in order to ensure perfect fluid-tightness between both pivoted elements of the body top and between any of the latter and a fixed part of the car body, the invention is characterized by the fact that a U-shaped member, secured on one of the said elements or on the fixed part, is arranged under the joint itself in order to constitute a trough; one of the flanges of the said U-shaped member bears on a distortable part (made of rubber for instance) which is respectively secured on the other movable element or on the adjacent movable element.

The invention will be more clearly understood from the following description, with reference to the accompanying drawings given by way of example only and in which:

Fig. 1 is an elevation, partly in section, of a collapsible body top capable of being stowed away and constructed according to the invention, the body top being in position on the vehicle.

Fig. 2 is a partial sectional elevation showing the body top stowed away or withdrawn within the spider.

Fig. 3 is a sectional view seen from the rear and corresponding to Fig. 1.

Fig. 4 is a detail view, on an enlarged scale, of a resilient device.

Figs. 5 and 6 illustrate, on an enlarged scale, the device for locking the body top.

Fig. 7 is a diagram of the electric connections of the motor for operating the body top.

Fig. 8 is a partial view, on an enlarged scale, of the lever for actuating the spider cover.

Fig. 9 is a perspective view of the device ensuring fluid-tightness.

The motor car provided according to the invention with a body top capable of being stowed away can be rapidly converted into a torpedo or into a closed car, it being impossible, for an uninformed person, either occupying the vehicle or outside the same, to ascertain or even to suspect that this car can be converted as indicated.

In the form of construction illustrated which, on trial, has given entire satisfaction, the body top is constituted by two elements 1 and 2 pivoted about common co-axial shaft or pivot rod 3, the rear part 3 being journalled about a shaft or pivot pin 4 mounted on the chassis of the vehicle. The rear part 5 of the car body constitutes a receptacle for the elements 1 and 2 of the body top when the latter is stowed away or concealed within the said receptacle. The receptacle 5 or spider is closed, at its upper part, by a cover 6 pivoted about a shaft or pivot pin 7.

Small side links 8, pivoted about co-axial shafts or pivot pins 9 mounted on the car body, are also pivoted on the front element 1 of the body top about co-axial shafts or pivot pins 10, the shaft 3 or pivot rod being placed, when the body top is in position for use, between the shafts or pivot pins 9 and 10.

According to the invention and in order to provide a simple and practical device capable of being commercially manufactured, opening of the spider, that is to say the actuation of the cover 6 is effected by means of control means independent of the means effecting the displacement of the body top, the said first mentioned means controlling however, at the end of their displacement, the said second means.

The cover 6, which is relatively light, can be moved by hand without necessitating great efforts. For that purpose, I use a lever 11 placed within reach of the driver of the vehicle, this lever being rigid with a shaft 12 journalled in bearings rigid with the car body. A sprocket wheel 13, rigid with the shaft 12, is constantly in engagement with a chain 14, the length of which is function of the amplitude of maximum displacement of the lever 11; this chain is connected at its ends, at 14ª and 14ᵇ, to cables 15 and 16 which, in their turn, are connected at their free ends, at 17ª and 17ᵇ, to a chain 17 also in engagement with a sprocket wheel 18 rigid with a shaft 19 journalled in bearings rigid with the chassis of the vehicle. The shaft 19 extends transversely to the spider 5, and a lever 20 is keyed on the central part of the said shaft 19; this lever 20 is connected, by a link 21, to a lever 22, the link being pivotally connected, at 21ª and 21ᵇ, to the lever 20 and to the lever 22 respectively.

The lever 22 is rigid with the cover 6 and is journalled about the same shaft or pivot pins 23 as the latter, so that the movement of the control lever 11 in one direction or the other opens or closes the cover 6 of the spider 5.

The movement of the lever 11 in the direction of the arrow f causes, at the end of the displacement (position indicated in dot and dash lines in Fig. 1) the closing of the circuit of a motor 24 mounted on a rear plate 25 separating the part 26 of the car body reserved for the occupants, from the spider 5.

The control of the circuit of the motor will be described later on with reference to Fig. 7.

I have found that if it was very easy to effect by hand the opening and closing of the spider, a manual control could not practically be employed for controlling the displacements of the elements 1 and 2 of the body top. In fact, owing to the important stresses to be exerted, it is necessary to utilize an important speed reduction and, in this case, if a manual control is employed, the actuation of the body top, either for placing it in position for use, or for stowing it away, could only be effected very slowly. By using an electric motor 24, for effecting this displacement of the body top, I can employ a very important speed reduction and, consequently, a motor of very small power, whilst however providing sufficient rapidity of operation (less than ten seconds), this being very convenient when the car being uncovered, the occupants are caught in the rain.

The shaft of the electric motor is so shaped as to constitute at one end a worm 27, or alternatively a worm is secured on this shaft.

The worm 27 meshes with a worm wheel 28 rigid with a shaft 29 journalled in bearings mounted on the support 25. This shaft 29 terminates, at its upper part, in a worm 30 meshing with a worm wheel 31 rigid with a shaft 40 journalled in bearings provided on the car body.

The electric motor is a reversible motor the circuit of which is controlled, as previously indicated, by the lever 11 at the end of the movement of the latter. The device for controlling the reversal will be described later on with reference to Fig. 7.

The rotation of the motor 24 in one direction or the other, causes the body top to move in position for use, or to be stowed away or withdrawn within the spider.

An intermediate position of the elements 1 and 2 of the body top is more particularly shown in dot and dash lines in Fig. 1. The relative arrangement of the joints 3—4 and 10 automatically causes the relative angular displacement of the element 1 relatively to the element 2 and the folding down of the element 1 against the inner face of the element 2 in stowed away position, as more particularly shown in Fig. 2.

Owing to the fact that the body top is in an overhanging position and as I use an electric motor 24 of small power, it would be desirable to check and to brake the displacement of the elements of the body top at the end of their movement, in order that too important stresses should not be exerted on the irreversible system constituted by the worm 30 and worm wheel 31, and also in order to avoid shocks at the moment the body top is placed in position for use or when it is stowed away or withdrawn within the spider. For that purpose, the side links 8 are provided with extensions constituted by levers 8ª, at the ends of which are pivoted, at 33, rods 34 subjected to the action of a shock absorbing device acting more particularly in the extreme positions. In the form of construction illustrated, by way of example only, the rods 34 terminate in pistons 35 subjected to the action of springs 36, these units being arranged in cylinders 37 pivoted about spindles 38.

When the body top is in position for use, the front element 1 fits against the upper rail of the wind shield and is locked in this position. For that purpose, as more particularly shown in Figs. 5 and 6, the element 1 is provided with two side projections 39, of conical shape, entering corresponding perforations 40 provided in the posts of the wind shield, or in the rail 41 arranged at the upper part of the latter. The projections 39 are perforated for receiving the ends of rods or locking members 42, suitably guided in the rail and provided with racks 42ª which mesh with either side of a toothed wheel 43 causing, by its rotation, the locking members 42 to move into operative or inoperative position. The toothed wheel 43 is rigid with a shaft 44 suitably journalled in the rail 41, and the end of which projecting within the car body is provided with an operating knob 45.

In order to prevent the circuit of the motor 24 being closed when the body top is locked in position for use, I have provided on the circuit of the motor, a switch the position of which is a function of that of the member 45 controlling the device for locking the body top. For that purpose, a conducting finger 46 is provided on the shaft 44, this finger, when the body top is in unlocked position, fits between two contact pieces 47 of the circuit of the motor.

Fluid-tightness between the elements 1 and 2 is ensured, as illustrated more particularly in Fig. 9, by a U-shaped member 50 secured on the inner part of the element 1, by any suitable means, so as to constitute a receptacle for rain water which might leak through. The ends of this trough-like member open outside the car body. The flange of the member 50 bears on a rubber block 51 arranged within a U-shaped member 52, secured by one of its flanges to the inner part of the element 2 at a suitable distance therefrom, in order that the flange of the member 50 may press on the rubber block 51.

Fig. 7 more particularly illustrates the electric connections of the motor adapted to actuate the body top, and especially the control of this circuit by the lever 11 actuating the cover 6 and by the knob 45 controlling the locking device.

This circuit comprises:
—a wire 60 connecting one of the contact pieces 47 to the motor 24,
—a wire 61 connecting the other contact piece 47 to a main control switch 62, the switch being connected by a wire 63 to one of the contact pieces 64 of a switch closed by a finger 65 rigid with the lever 11, the other contact piece 64 being connected to the source of current supply 66 by a wire 67.

The circuit of the motor is the following: battery 66—wire 67—switch 64—wire 63—main switch 62—wire 61—switch 47—wire 60—motor 24 and body contact.

This circuit is controlled:
—by the main switch 62,
—by the switch 64 put in or out of action by the lever 11,
—by the switch 47 put in or out of action by the knob 47 for locking the body top.

The motor 24 is a reversible motor comprising a current reversing switch (not shown) controlled for instance by a cam the displacements of which are function of a definite number of revolutions of the motor.

It will also be noted that shock absorbing device facilitates, at the beginning of the displacement of the body top, the movement of the latter.

What I claim as my invention and desire to secure by Letters Patent is:

1. In a motor vehicle having a rigid movable body top made up of one or more elements capable of being stowed away within a spider provided with a cover, a lever movable by hand and constituting the first driving means for moving the cover, an electric motor constituting the second driving means for moving the movable elements of the body top, the said lever controlling, at the end of its movement, the circuit of the said motor, a device for locking the elements of the body top on the car body in position of use of this body top, the said locking device controlling also the circuit of the said motor.

2. In a motor vehicle having a car body, the combination of a spider mounted to the rear of the car body and provided with a movable cover, with a top including a rigid part hinged to the car body, means for opening and closing the movable cover of the spider, motor-actuated mechanism for turning the rigid part rearward to fold the top into the open spider, and a common means for controlling the operation of the motor-actuated mechanism and the means for opening and closing the cover of the spider.

GEORGES AUGUSTE PAULIN.